US012596541B2

(12) United States Patent
Bojilski et al.

(10) Patent No.: US 12,596,541 B2
(45) Date of Patent: Apr. 7, 2026

(54) CLONING A CLOUD-AGNOSTIC DEPLOYMENT

(71) Applicant: VMware LLC, Palo Alto, CA (US)

(72) Inventors: Kaloyan Bojilski, Sofia (BG); Stoyan Staykov Genchev, Sofia (BG); Iliya Uzunov, Sofia (BG)

(73) Assignee: VMware LLC, Palo Alto, CA (US)

( * ) Notice: Subject to any disclaimer, the term of this patent is extended or adjusted under 35 U.S.C. 154(b) by 236 days.

(21) Appl. No.: 18/382,293

(22) Filed: Oct. 20, 2023

(65) Prior Publication Data

US 2025/0130786 A1 Apr. 24, 2025

(51) Int. Cl.
*G06F 8/61* (2018.01)

(52) U.S. Cl.
CPC ...................................... *G06F 8/63* (2013.01)

(58) Field of Classification Search
CPC ........ G06F 8/63; G06F 11/14; G06F 9/45558; G06F 2009/45562; G06F 2009/4557
See application file for complete search history.

(56) References Cited

U.S. PATENT DOCUMENTS

| | | | | |
|---|---|---|---|---|
| 9,170,831 | B2 * | 10/2015 | Robinson | ................ G06F 9/485 |
| 11,126,448 | B1 * | 9/2021 | Christensen | ............. G06F 9/50 |
| 2014/0149695 | A1 | 5/2014 | Zaslavsky et al. | |
| 2016/0320978 | A1 * | 11/2016 | Barve | ................... G06F 3/0689 |
| 2019/0065323 | A1 | 2/2019 | Dhamdhere et al. | |
| 2024/0078124 | A1 * | 3/2024 | Mapes | ................ G06F 9/45558 |

OTHER PUBLICATIONS

European Patent Office, Extended Search Report, Application No. 24206466.5, Mar. 6, 2025, 10 pages.

* cited by examiner

*Primary Examiner* — Marina Lee

(74) *Attorney, Agent, or Firm* — Kim & Stewart LLP

(57) ABSTRACT

Cloning a cloud-agnostic deployment is described herein. One example method includes receiving modifications to an existing deployment created using a blueprint in a virtualized environment, and performing a deployment clone operation responsive to receiving a request to clone the deployment. The deployment clone operation can include creating an image associated with a virtual computing instance (VCI) of the deployment, creating a snapshot associated with a disk of the deployment, generating a clone blueprint based on the image and the snapshot, and deploying the clone blueprint in the virtualized environment.

20 Claims, 5 Drawing Sheets

```
Example Cloud Template:

formatVersion: 1
Inputs: {}
resources:
 Cloud_Machine_1:
 type: Cloud Machine
 properties:
   image: ubuntu
   flavor: small
   networks:
   - network: ${resource.Cloud_Network_1.id}
   attachedDisks:
   - source: ${resource.Cloud_Vloum_1_id.}
 Cloud_Network_1:
 type: Cloud.Network
 properties:
   networkType: existing
 Cloud_Vloume_1:
 type: Cloud. Volume
 properties:
   capacityGb: 1
```

```
formatVersion: 2
Inputs: {}
resources:                                                    238
 Cloud_Machine_1:
 type: Cloud Machine
 properties:
   imageRef: ${the-just-generated-ami}
   flavorRef: {the-id-of-the-instance-type-of-the-original-machnie}
   networks:
   - subnetid: {the-id-of-the-subnet-of-the-original-virtual-machnie}
   attachedDisks:
   - source: ${resource.Cloud_Volum_1.id}
 Cloud_Vloume_1:
 type: Cloud. Volume
 properties:
   snapshotid: {the-id-of-the-just-generated-snapshot}

OR formatVersion: 2
Inputs: {}
resources:
 Cloud_Machine_1:
 type: Cloud Machine
 properties:
   imageRef: ${the-just-generated-ami}
   flavorRef: {the-id-of-the-instance-type-of-the-original-machnie}
   networks:
   - network: ${resource.Cloud_Network_1.id}
   attachedDisks:
   - source: ${resource.Cloud_Volum_1.id}
 Cloud_Network_1:
 type: Cloud. Network
 properties:
   networkType: existing
 Cloud_Volume_1:
   type: Cloud.Volume
   properties:
     snapshotid: {the-id-of-the-just-generated-snapshot}

(Based on the information user has provided to the wizard,
exact same network of original machine is used
or one is selected based on user's Aria Automation infrastructure setup)

(Note how image and flavor from original cloud template are change to imageRef and flavorRef
and also how snapshotid is leveraged)

(Note capacityGb is entirely skipped
as disk might have been resized on cloud provider level directly)
```

CLONING A CLOUD-AGNOSTIC DEPLOYMENT

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

BRIEF DESCRIPTION OF THE DRAWINGS

FIGS. 2A-2C are flow charts associated with cloning a cloud-agnostic deployment according to one or more embodiments of the present disclosure.

DETAILED DESCRIPTION

Figure 1:
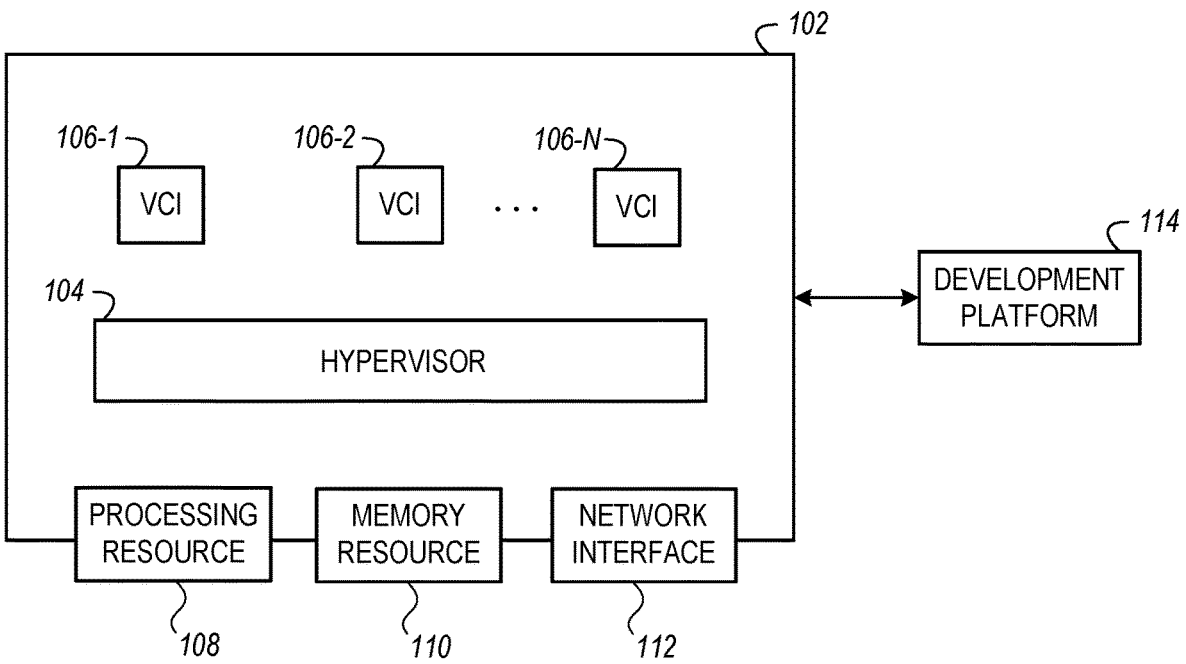
FIG. 1 is a diagram of a host and a system for cloning a cloud-agnostic deployment according to one or more embodiments of the present disclosure.

As referred to herein, a virtual computing instance (VCI) covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization that can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in an SDDC. In such a system, information can be propagated from a client (e.g., an end user) to at least one of the VCIs in the system, between VCIs in the system, and/or between at least one of the VCIs in the system and a server. SDDCs are dynamic in nature. For example, VCIs and/or various application services, may be created, used, moved, or destroyed within the SDDC. When VCIs are created, various processes and/or services start running and consuming resources. As used herein, "resources" are physical or virtual components that have a finite availability within a computer or SDDC. For example, resources include processing resources, memory resources, electrical power, and/or input/output resources.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

A development platform can be used to configure and/or provision resources in a virtualized environment. One example of such a development platform is VMware's vRealize Automation (sometimes referred to herein as "vRA"). vRA is a cloud management layer that sits on top of one or more clouds (e.g., different clouds). It can provision complex deployments and offer governance and management of these workloads and the resources in the cloud. A development platform in accordance with the present disclosure can be designed to automate multiple clouds with secure, self-service provisioning.

vRA enables administrators to setup infrastructure resources (e.g., compute, storage, network), image mappings and instance type mappings. Once setup, users can submit provisioning requests with cloud-agnostic parameters. The resources might be fixed for some specific cloud provider or agnostic so the system of cloud assembly would choose the cloud provider based on the infrastructure constructs (image and flavor mappings, network and storage profiles) set by the user. If a client wants to create a backup of some resource, so they can recover it later in case of breakdown, or if they want to save a different version of a resource, they can create a snapshot or image of that resource. However, that backup action can be created on resources only. That is because the different virtual components, such as machines, and storage, can be backed up on the different cloud providers, via images and snapshots.

The problem is that "deployment" is a concept particular to a development platform like vRA (e.g., particular to Cloud Assembly); other third parties such as cloud providers do not understand (and do not have to understand) the deployments in Cloud Assembly. That is why, in previous approaches, a user cannot create a copy or create a backup resource for a desired deployment. If they could, though, it would be very useful for some particular cases.

For instance, if a user has a more complex deployment, with lots of coupled resources, each one of them is already configured with desired storage space, processor capacity, and/or custom configurations, and there are already installed and configured applications and directories on the machines. If they have that kind of deployment and they want to create ten other deployments the same as the initial one, they have to replicate the same process ten times. Also, if a user has a deployment with important information and wants to create a copy of it but deploy the copy on a different data center around the world, they would have to go to the cloud and manually create it (e.g., not using vRA). Furthermore, a user may have a cloud template, but after they deploy it, they change the deployment by executing day two actions or just modify the configuration and the content of a machine in that deployment.

For cases like these, embodiments of the present disclosure allow a customer to replicate their deployment without data loss and in an easy, economical, and timely manner. For example, embodiments herein create that clone functionality. To create a deployment, a respective blueprint (e.g., template) is first deployed. Accordingly, the source of information for a new deployment must not be another deployment, but a blueprint.

Embodiments of the present disclosure integrated into vRA the ability to create an image on the cloud for every machine in one's deployment and a snapshot for every storage in the deployment. The reference (by ID, self-link, and more) for those images and snapshots is stored locally on the database. Embodiments herein can provision a disk by using snapshot as a source of information. Embodiments herein add deployment day-two action which automatically chooses for each resource a respective action to be done (e.g., creating images from machines, creating snapshots from disks, etc.) and then creates and executes a flow for provisioning by using the newly created images and snapshots as a source of information. It keeps the connections between the different resources as the way they were in the deployment on which the day-two action was called on. Embodiments herein include a wizard, which can allow a user either to create the very same deployment (e.g., a clone) or to modify it (e.g., by adding custom boot config script for machines, changing the network configuration, etc.) This gives a user the freedom not only to clone a deployment but to do more.

FIG. 1 is a diagram of a host and a system for cloning a cloud-agnostic deployment according to one or more embodiments of the present disclosure. The host 102 can be provisioned with processing resource(s) 108 (e.g., one or more processors), memory resource(s) 110 (e.g., one or more main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs 106 can be local and/or remote to the host 102 (e.g., the VCIs 106 can be ultimately executed by hardware that may not be physically tied to the VCIs 106). For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, the host 102 can be connected to (e.g., in communication with) a development platform 114. Though not shown in FIG. 1, The development platform can be connected to one or more clouds via one or more cloud providers (e.g., AWS, Azure, etc.).

Figure 2A:
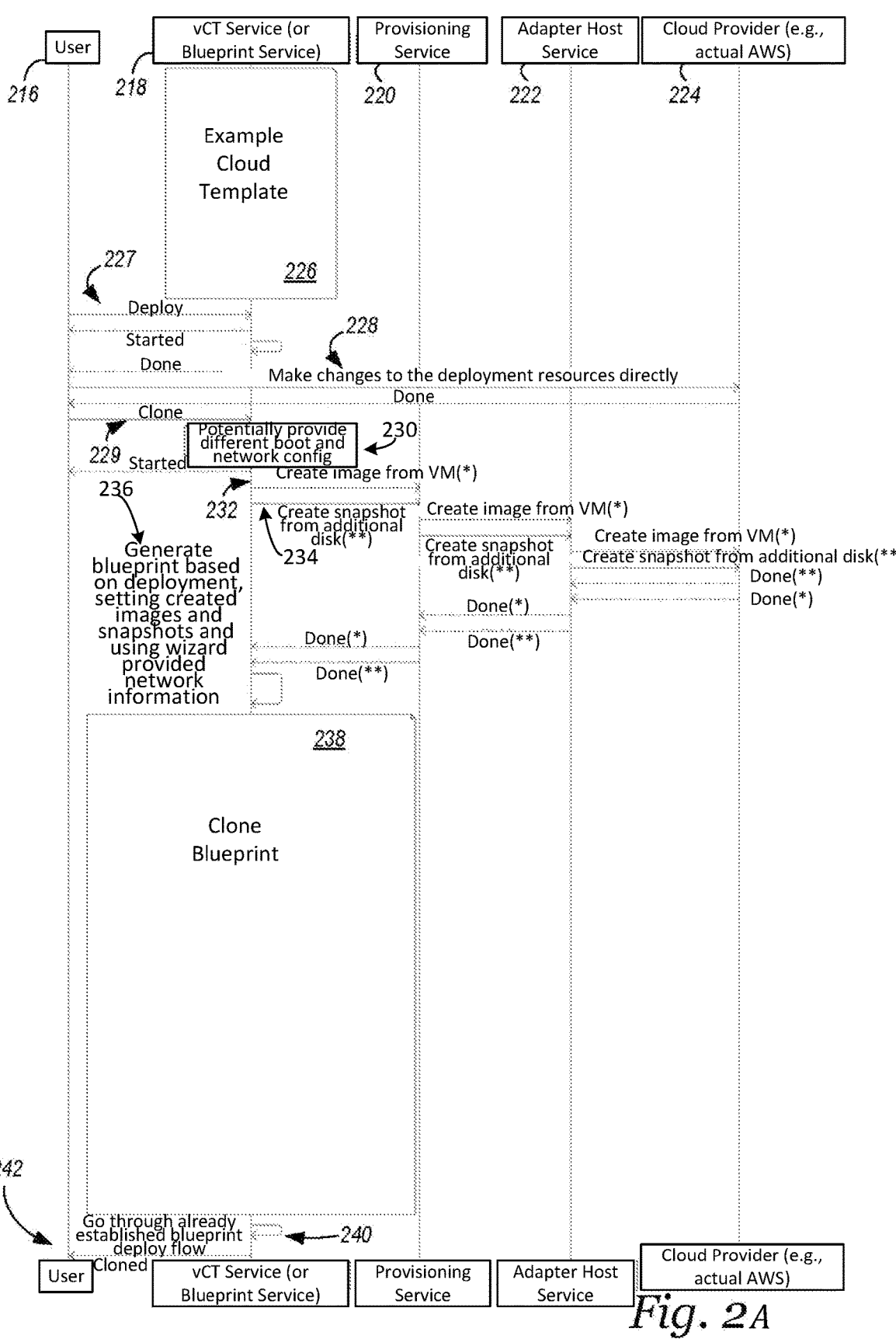

FIGS. 2A-2C are flow charts associated with cloning a cloud-agnostic deployment according to one or more embodiments of the present disclosure. As shown in FIG. 2A, the flow chart includes a user 216, a blueprint service 218, a provisioning service 220, an adapter host service 222, an a cloud provider 224. A blueprint (e.g., template) 226, as shown in FIG. 2B, can be deployed at 227. Changes to the deployment can be made by the user 216 at 228. Such changes can include, for example, the installation of libraries and/or the updating of configuration files. At 229, a request to clone the deployment is received by the blueprint service 218 from the user 216. At 230, a different boot configuration and/or network can be specified by the user 216. If not, the same network and/or boot configuration of the initial deployment can be used. At 232, an image is created from the VCI, and, at 234, a snapshot is created from an additional disk of the deployment. At 236, a clone blueprint 238, as shown in FIG. 2C, is generated by the blueprint service based on the deployment, the image(s), the snapshot(s), and any network information provided previously (e.g., at 230). The clone blueprint can be deployed at 240 with the deployment of the clone successful at 242.

Figure 3:
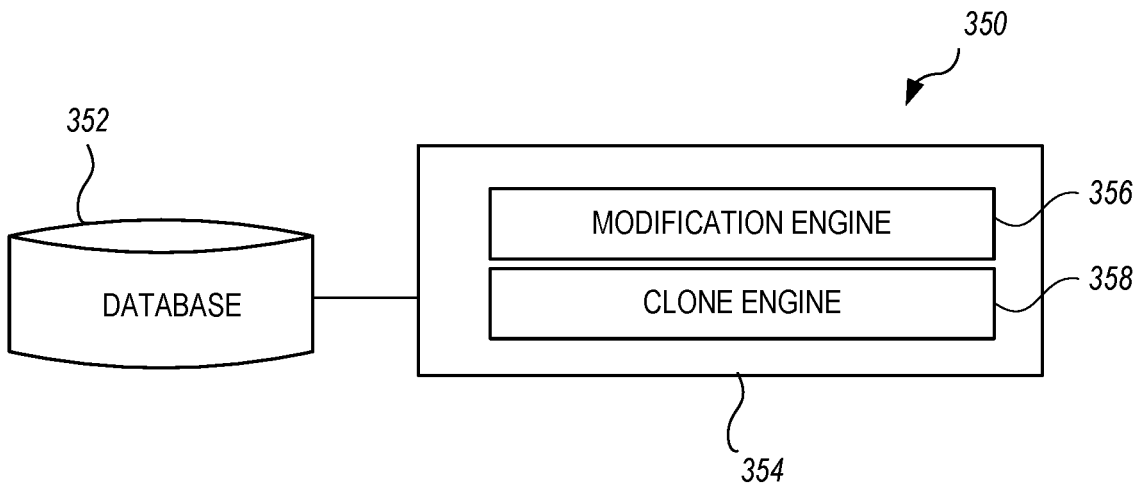
FIG. 3 illustrates a system for cloning a cloud-agnostic deployment according to one or more embodiments of the present disclosure.

FIG. 3 illustrates a system 350 for cloning a cloud-agnostic deployment according to one or more embodiments of the present disclosure. The system 350 can include a database 352, a subsystem 354, and/or a number of engines, for example modification engine 356 and/or clone engine 358, and can be in communication with the database 352 via a communication link. The system 350 can include additional or fewer engines than illustrated to perform the various functions described herein. The system can represent program instructions and/or hardware of a machine (e.g., machine 460 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the modification engine 356 can include a combination of hardware and program instructions that is configured to receive modifications to an existing deployment created using a blueprint in a virtualized environment. In some embodiments, the clone engine 358 can include a combination of hardware and program instructions that is configured to perform a deployment clone operation responsive to receiving a request to clone the deployment. In some embodiments, the deployment clone operation includes creating an image associated with a virtual computing instance (VCI) of the deployment. In some embodiments, the deployment clone operation includes creating a snapshot associated with a disk of the deployment. In some embodiments, the deployment clone operation includes generating a clone blueprint based on the image and the snapshot. In some embodiments, the deployment clone operation includes deploying the clone blueprint in the virtualized environment.

Figure 4:
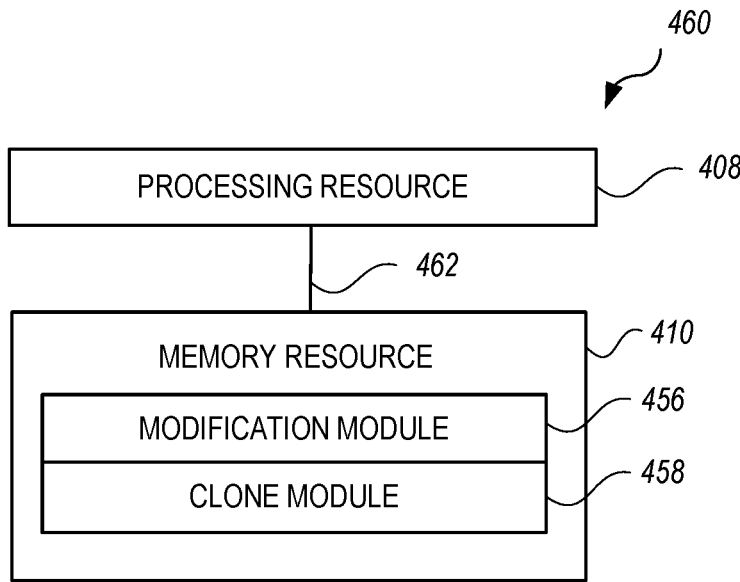
FIG. 4 is a diagram of a machine for cloning a cloud-agnostic deployment according to one or more embodiments of the present disclosure.

FIG. 4 is a diagram of a machine 460 for cloning a cloud-agnostic deployment according to one or more embodiments of the present disclosure. The machine 460 can utilize software, hardware, firmware, and/or logic to perform a number of functions. The machine 460 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 460 (e.g., the machine 460 can include internal memory resources and have access to external memory resources). In some embodiments, the machine 460 can be a virtual computing instance (VCI) or other computing device. The term "VCI" covers a range of computing functionality. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

The program instructions (e.g., machine-readable instructions (MRI)) can include instructions stored on the MRM to implement a particular function (e.g., an action such as performing a deployment clone operation). The set of MRI can be executable by one or more of the processing resources 408. The memory resources 410 can be coupled to the machine 460 in a wired and/or wireless manner. For example, the memory resources 410 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EE-PROM), phase change random access memory (PCRAM), magnetic memory, optical memory, and/or a solid state drive (SSD), etc., as well as other types of machine-readable media.

The processing resources 408 can be coupled to the memory resources 410 via a communication path 462. The communication path 462 can be local or remote to the machine 460. Examples of a local communication path 462 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 462 can be such that the memory resources 410 are remote from the processing resources 408, such as in a network connection between the memory resources 410 and the processing resources 408. That is, the communication path 462 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 456, 458 that when executed by the processing resources 408 can perform a number of functions. As used herein a module includes a set of instructions included to perform a particular task or action. The number of modules 456, 458 can be sub-modules of other modules. For example, the clone module 458 can be a sub-module of the modification module 456 and/or can be contained within a single module. Furthermore, the number of modules 456, 458 can comprise individual modules separate and distinct from one another. Examples are not limited to the specific modules 456, 458 illustrated in FIG. 4.

One or more of the number of modules 456, 458 can include program instructions and/or a combination of hardware and program instructions that, when executed by a processing resource 408, can function as a corresponding engine as described with respect to FIG. 3. For example, the clone module 458 can include program instructions and/or a combination of hardware and program instructions that, when executed by a processing resource 408, can function as the clone engine 358.

For example, the machine 460 can include a modification module 456, which can include instructions to receive modifications to an existing deployment created using a blueprint in a virtualized environment. For example, the machine 460 can include a clone module 458, which can include instructions to perform a deployment clone operation responsive to receiving a request to clone the deployment. In some embodiments, the deployment clone operation includes creating an image associated with a virtual computing instance (VCI) of the deployment. In some embodiments, the deployment clone operation includes creating a snapshot associated with a disk of the deployment. In some embodiments, the deployment clone operation includes generating a clone blueprint based on the image and the snapshot. In some embodiments, the deployment clone operation includes deploying the clone blueprint in the virtualized environment.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 408 in FIG. 4. A group or plurality of similar elements or components may generally be referred to herein with a single element number. For example, a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of cloning a cloud-agnostic deployment, comprising:
   receiving modifications to an existing deployment created using a blueprint in a first virtualized environment; and
   performing a deployment clone operation responsive to receiving a request to clone the deployment, wherein the deployment clone operation includes:
   creating an image associated with a virtual machine of the deployment;
   creating a snapshot associated with a disk of the deployment;
   generating a clone blueprint based on the image of the virtual machine and the snapshot of the disk; and
   deploying the clone blueprint in a second virtualized environment that is different from the first virtualized environment.

2. The method of claim 1, wherein the method includes providing an interface associated with customizing the clone blueprint.

3. The method of claim 2, wherein the method includes receiving, via the interface, an indication of a preference for using a same network configuration for the clone blueprint as a network configuration used for the blueprint.

4. The method of claim 2, wherein the method includes receiving, via the interface, an indication of a preference for using a different network configuration for the clone blueprint than a network configuration used for the blueprint.

5. The method of claim 1, wherein the method includes deploying the existing deployment on a first datacenter and deploying the clone blueprint on a second datacenter.

6. The method of claim 1, wherein receiving modifications to the existing deployment includes executing day-two actions associated with the existing deployment.

7. The method of claim 1, wherein receiving modifications to the existing deployment includes receiving updates to configuration files associated with the existing deployment.

8. A non-transitory machine-readable medium having instructions stored thereon which, when executed by a processor, cause the processor to carry out a method of cloning a cloud-agnostic deployment, the method comprising:
   receiving modifications to an existing deployment created using a blueprint in a first virtualized environment; and
   performing a deployment clone operation responsive to receiving a request to clone the deployment, wherein the deployment clone operation includes:
   creating an image associated with a virtual machine of the deployment;
   creating a snapshot associated with a disk of the deployment;
   generating a clone blueprint based on the image of the virtual machine and the snapshot of the disk; and
   deploying the clone blueprint in a second virtualized environment that is different from the first virtualized environment.

9. The medium of claim 8, including instructions to provide an interface associated with customizing the clone blueprint.

10. The medium of claim 9, including instructions to receive, via the interface, an indication of a preference for using a same network configuration for the clone blueprint as a network configuration used for the blueprint.

11. The medium of claim 9, including instructions to receive, via the interface, an indication of a preference for using a different network configuration for the clone blueprint than a network configuration used for the blueprint.

12. The medium of claim 8, including instructions to deploy the existing deployment on a first datacenter and deploy the clone blueprint on a second datacenter.

13. The medium of claim 8, wherein the instructions to receive modifications to the existing deployment include instructions to execute day-two actions associated with the existing deployment.

14. The medium of claim 8, wherein the instructions to receive modifications to the existing deployment include instructions to receive updates to configuration files associated with the existing deployment.

15. A system comprising processing and memory resources that are configured to carry out a method of cloning a cloud-agnostic deployment, the method comprising:
   receiving modifications to an existing deployment created using a blueprint in a first virtualized environment; and performing a deployment clone operation responsive to receiving a request to clone the deployment, wherein the deployment clone operation includes:

creating an image associated with a virtual machine of the deployment;

creating a snapshot associated with a disk of the deployment;

generating a clone blueprint based on the image of the virtual machine and the snapshot of the disk; and deploying the clone blueprint in a second virtualized environment that is different from the first virtualized environment.

16. The system of claim 15, wherein the processing and memory resources are further configured to provide an interface associated with customizing the clone blueprint.

17. The system of claim 16, wherein the processing and memory resources are further configured to receive, via the interface, an indication of a preference for using a same network configuration for the clone blueprint as a network configuration used for the blueprint.

18. The system of claim 16, wherein the processing and memory resources are further configured to receive, via the interface, an indication of a preference for using a different network configuration for the clone blueprint than a network configuration used for the blueprint.

19. The system of claim 15, wherein the processing and memory resources are further configured to deploy the existing deployment on a first datacenter and deploy the clone blueprint on a second datacenter.

20. The system of claim 15, wherein receiving modifications to the existing deployment includes executing day-two actions associated with the existing deployment.

* * * * *